Dec. 4, 1956     J. D. HOFFMAN     2,772,691

FLUID FLOW REGULATOR

Filed April 22, 1953

James David Hoffman
INVENTOR.

BY *[signature]*

HIS PATENT ATTORNEY.

United States Patent Office 2,772,691
Patented Dec. 4, 1956

2,772,691

FLUID FLOW REGULATOR

James David Hoffman, Pacific Palisades, Calif., assignor to North American Aviation, Inc.

Application April 22, 1953, Serial No. 350,473

2 Claims. (Cl. 137—220)

The present invention relates to flow control means and more particularly to improvements in fluid control valves for regulating the flow of fluids within predetermined limits.

This invention is directed to improved forms of automatic fluid flow limiting devices which are readily adapted for installation within a conduit and comprise primarily a spring-biased sliding or movable valve element which forms an annular orifice; and the valve element is automatically positioned in accordance with the pressure drop across the element in the downstream direction at which minimum orifice position it limits and controls the flow rate. The present invention is also directed to an improved form of a fluid flow regulator valve comprising an inner constant flow conduit around which is slidably carried a spring-biased valve member which forms, in cooperation with the valve housing, an annular conduit, and moves to its downstream minimum orifice position to substantially close the area of the annular outlet to thereby control the rate of flow. The present improved regulator units have a relatively low pressure drop across the unit and are particularly adapted for limiting the fuel flow in aircraft to prevent damage to a fuel system or installation designed for refueling at medium pressures in the event the refueling operation is conducted with high pressure equipment.

It is, accordingly, a major object of the present invention to provide a fluid flow regulating device which is simple in construction, light in weight and which operates automatically to limit the rate of fluid flow despite use under different fluid pressures. A further object resides in the provision of such a regulator unit which can be installed in a fluid line without the necessity of relief valves or other equipment and which operates automatically without the necessity of manual attention. It is a still further object to provide improved flow limiter devices of the type described which have a relatively low pressure drop across the device to thereby incur a minimum resistance to the flow of fluid through the conduit with the resulting saving in power costs for pumps or other means for moving the fluid.

Other objects and advantages of the present invention will become obvious to those skilled in the art following a reading of the present description, taken in conjunction with the accompanying drawings, forming a part hereof, in which.

Figure 1:
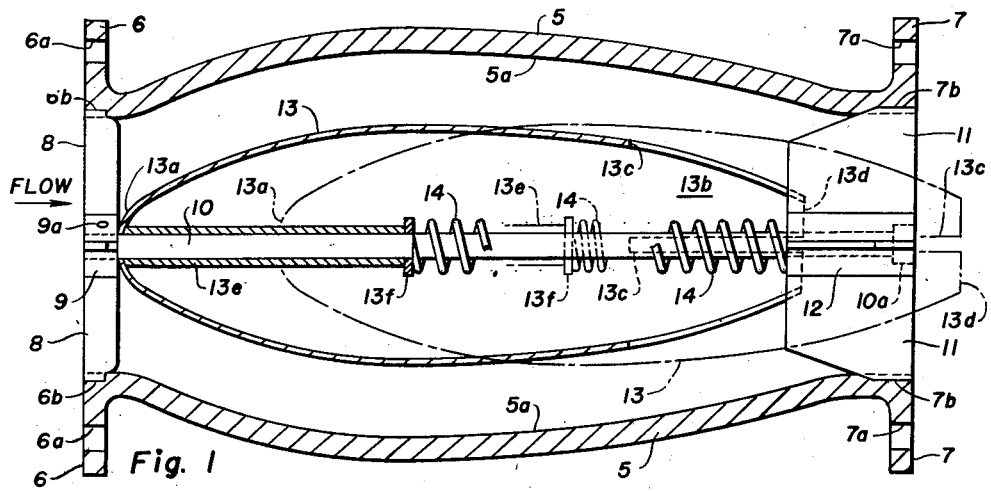
Fig. 1 is a cross-sectional view of a fluid flow regulating device embodying the present invention.
Figure 2:
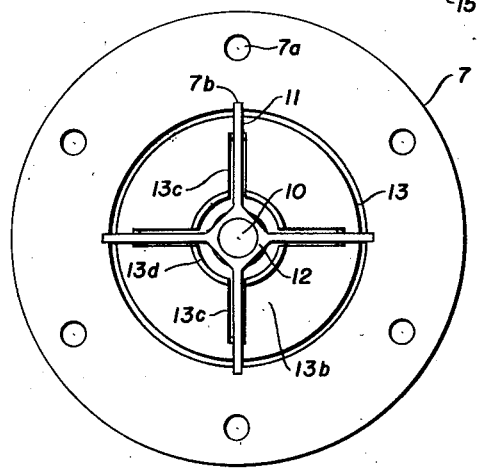
Fig. 2 is an end elevational view of the same.

Referring now to Figs. 1 and 2, the numeral 5 indicates the housing or body of the valve or regulator device which has an internal wall 5a of streamline conformation. The body 5 is provided with end flanges 6 and 7 for attachment to the adjacent portions of a conduit into which it may be installed by attachment of suitable bolts within the holes 6a and 7a in these flanges. At the inlet to the device, there is provided a spider 8 consisting of four radial fins having their outer ends retained within the recesses 6b in the valve body 5 and joined at their inner terminals adjacent the central axis of the device by means of the spider hub 9. The latter is provided with an axial bore to receive the central stem or rod 10, the forward terminal of which is retained within the hub by a suitable pin 9a and an enlarged cylindrical head portion 10a is integrally formed on the outlet or trailing end of the stem 10. A spider 11, similarly formed of four radially extending fins having their outer or tip portions retained within the notches 7b in the valve body 5, is provided with a central hub 12 which receives the enlarged head 10a at the outlet end of the stem 10. The fins 8 and 11 extend longitudinally of the device or in the direction of the fluid flow, the width of the fins 11 being several times greater than that of the fins 8 to provide guide vanes of substantial length at the outlet of the valve.

Co-axially mounted upon the rod or stem 10 is a streamlined movable valve element 13 of circular cross-section having a nose portion 13a and a trailing portion 13b provided with four slots 13c within which are received the abovementioned vanes or fins 11. The trailing portion 13d of the movable element 13 is cut-off transversely at such a point that the fins 11 extend for a short distance into the slots 13c in the forward or maximum flow position of the valve element 13 as shown in the full lines in Fig. 1. The movable valve element 13 is of hollow and relatively light sheet construction and has attached internally at the leading edge 13a the tubular guide or sleeve portion 13e fixedly attached to the leading edge 13a, being of an internal diameter which slides readily along the rod 10 and is provided at its aft end with a transverse flange or spring abutment annular washer 13f. Between this abutment washer 13f and the forward end of the central hub 12 of the outlet vane 11 there is disposed a compression spring 14, which opposes downstream movement of the valve element 13 but, when it is overcome by full flow rate conditions, permits the element 13 to move downstream to the position shown in the construction lines in Fig. 1, in which the spring 14 is compressed and the slots 13c move downstream with the valve element 13 in respect to the body 5 and about the outlet fins 11. Adjustment means (not shown) may be suitably provided for the spring 14.

In the operation of the flow regulator of Fig. 1, when subjected to fluid flowing at the maximum predetermined rate for which the regulator is designed and at a predetermined pressure of the fluid, the drag or resistance of the movable valve element 13 in opposing the downstream flow of the fluid is drawn downstream with the fluid to the position shown in the construction lines in which it throttles the annular opening at the valve outlet to the point at which the flow is limited to the predetermined rate. The full movement downstream of the movable element 13 is reached when the pressure drop across the regulator reaches a maximum and at this throttling or partially closed position of the valve or regulator the flow is maintained at substantially the predetermined flow rate. It cannot, however, close off the flow completely as the axial length of the slots 13c limit its downstream movement. In an actual test of the present flow regulator valve designed for a flow rate of 250 gallons per minute at a refueling pressure of 250 p. s. i. the valve remained fully open but upon increase of the delivery pressure the valve moved to the closed position where it passed approximately 240 gallons per minute. This regulator unit was utilized to limit the fuel flow to prevent damage to an aircraft fuel system designed for refueling at medium pressures of approximately 250 p. s. i. in the event the refueling operation was conducted with the higher pressure equipment of approximately 650 p. s. i. in order that the system within the aircraft could accommodate the standard Army and Navy installations which vary in respect to these pressures and to operate with either one without damage to the fuel system, and maintain substantially constant flow.

Figure 3:
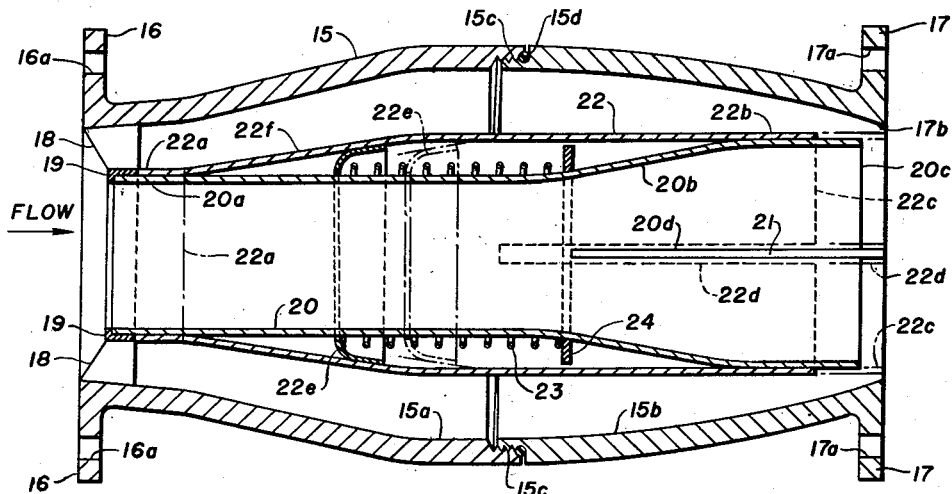
Fig. 3 is a similar cross-sectional view of a further form of fluid flow regulating device.

Referring now to Fig. 3, a further form of flow regulating device is shown wherein the valve body 15 is comprised of two sections 15a and 15b which may be threadedly joined by the threads 15c and made pressure-tight by the O-ring seal 15d. The inner wall of the inlet section 15a is preferably formed of tapered or frusto-conical portions with the lesser taper at the inlet and terminating in a substantially cylindrical portion adjacent the threads 15c. The outlet portion 15b of the regulator is preferably provided with an inner wall of substantially streamlined form conforming to the corresponding portion of the regulator of Fig. 1. The inlet portion is provided with a flange 16 having mounting bolt holes 16a and the outlet portion is similarly provided with the flange 17 and the mounting bolt holes 17a. An inlet support member 18 is comprised of a plurality of radially extending fins or vanes which are centrally joined by the annular ring element 19. Within the annular ring element 19 at the inlet of the regulator 15 there is fixedly supported the inner tubular conduit member 20 having a forward cylindrical portion 20a, an outwardly tapering portion 20b and a further cylindrical portion of enlarged diameter terminating in the outlet edge 20c. Co-axially disposed about the inner tubular element or constant flow conduit 20 is the outer movable valve element 22 having a cylindrical inlet portion 22a slidingly engaging the outer wall of the forward inner tube 20a and, in the maximum flow condition of the regulator, having its leading edge abutting against the support ring 19. The forward portion of the outer tube 22 includes an increasingly tapered portion 22f and a straight cylindrical outlet portion 22b terminating in its trailing or outlet edge 22c. The aft portions of both tubes 20 and 22 are slotted at 20d and 22d to receive the single transverse fin or vane 21 which extends horizontally across the regulator for support within the sides of the aft wall portion 15b. The slots 20d within the inner tube 20 fit closely and may preferably be attached about the vane 21 such that the inner tube 20 is fixedly supported by the vane 21 and is prevented from moving in any direction with respect thereto. The slot 22d within the aft portion 22b of the outer tube 22 is provided with sufficient clearance that the outer tube may be slidingly moved down-stream and into the outlet without restriction by the vane 21. Such downstream movement is opposed by the intermediate compression spring 23 engaging at its forward terminal the spring cup 22e which is fixedly attached to the inner wall of the outer tube portion 22f and the spring is opposed at its aft or down-stream terminal by the abutment ring or washer 24 which bears against the leading edge of the cross vane 21. Suitable adjustment means (not shown) may be provided for the spring 23.

The operation of the regulating device of Fig. 3 differs essentially from that shown in Fig. 1 by virtue of the fact that the inner tube 20 is open at all times and permits a substantially constant flow of fluid therethrough, whereas the increasing diameter and form of the spring-loaded outer tube 22 offers resistance or drag to that annular portion of the fluid flow which moves down-stream outside of the annular inlet support ring 19 and between the inner walls of the regulator body and the outer surface of the outer element 22. When the resistance to this movement and the accompanying pressure drop increases, the element 22 gradually moves down-stream pressing the spring 23 until under maximum pressure drop conditions the trailing edge 22c of the outer tube reaches and extends into the outlet 17b of the regulator at which the flow is substantially fully restricted and limited to that flowing through the central annular conduit 20.

As indicated above, the present fluid flow regulators are particularly adapted to limiting fuel flow at two or more widely varying ranges of operating pressures such as are met with in aircraft being serviced at Army and Navy installations, one of which having a standard refueling operating pressure of 250 p. s. i. and the other refueling pressure conducted with high pressure equipment of 650 p. s. i. These conditions are met with particularly in aircraft susceptible of servicing from aircraft carrier high pressure installations as well as those at land bases where the low pressure systems are employed.

Other forms and modifications of the present invention, which will become apparent to those skilled in the art, after reading the foregoing description are intended to come within the scope and spirit of this invention as more particularly set forth in the appended claims.

I claim:

1. In a flow regulating device, a body member having inlet and outlet portions and an intermediate wall portion, support means disposed across said body inlet, support means disposed across said body outlet, an inner tubular element fixedly supported by said inlet and said outlet support means, an outer tubular element slidingly mounted upon said inner tubular element and having a tapered portion intermediate its ends merging in a portion of enlarged cross-section greater than that of the adjacent portion of the inner tubular element thereby forming a hollow space between the said inner and outer tubular elements, said tubular elements arranged to permit fluid flow through said inner element and outside of said outer element whereby increased flow rates of a predetermined magnitude cause axial movement of said outer tubular element to cause a portion thereof to assume a position adjacent said outlet to restrict said outer fluid flow and confine the fluid flow to a substantially predetermined rate through said inner tubular element, and resilient means disposed within the hollow space between said tubular elements in the vicinity of the tapered portion of said outer tubular element to oppose said axial movement of said outer tubular element.

2. A fluid flow regulating device comprising a casing having aligned inlet and outlet openings, support means adjacent the said openings extending inwardly from the casing, an elongated guide means mounted at each end in said support means to extend co-axially through the interior of the casing, the guide means being formed as a hollow member to serve as the main conduit for fluid flow through the device, the guide means being further formed with an inlet opening smaller than that of the casing, an elongated hollow member mounted for limited sliding movement on the guide means but having an enlarged central portion thereof forming a hollow chamber in surrounding relation to the guide means, and forming with the inner wall of the casing an elongated annular secondary conduit, and a resilient member contained within the said hollow chamber adapted to urge the hollow member in one direction of its sliding movement on the guide means, the configuration of the outlet end of the hollow body adapting it to approach closer to the casing wall adjacent the outlet opening as it moves on the guide means, whereby the hollow member is adapted to function as a valve element controlling the size of the secondary conduit.

References Cited in the file of this patent

UNITED STATES PATENTS

| | | |
|---|---|---|
| 108,162 | Lynde | Oct. 11, 1870 |
| 1,063,933 | Keller | June 3, 1913 |
| 1,290,122 | Donovan | Jan. 7, 1919 |
| 1,361,180 | Pokorny | Dec. 7, 1920 |
| 1,659,704 | Rhodes | Feb. 21, 1928 |
| 1,802,720 | Junkers | Apr. 28, 1931 |
| 1,944,088 | Linderoth | Jan. 16, 1934 |
| 2,022,143 | Mottershall | Nov. 26, 1935 |
| 2,647,531 | Berck | Aug. 4, 1953 |
| 2,678,066 | Carter | May 11, 1954 |

FOREIGN PATENTS

| | | |
|---|---|---|
| 80,138 | Sweden | Apr. 17, 1934 |